United States Patent [19]

Campbell

[11] Patent Number: 4,892,968
[45] Date of Patent: Jan. 9, 1990

[54] 3,3'-DICHLORO-4,4-DIAMINODIPHENYL SULFONIC ACIDS

[75] Inventor: Colin D. Campbell, Beith, Scotland

[73] Assignee: Ciba-Geigy Corporation, Ardsley, N.Y.

[21] Appl. No.: 226,008

[22] Filed: Jul. 29, 1988

[30] Foreign Application Priority Data

Aug. 7, 1987 [GB] United Kingdom ............... 8718798

[51] Int. Cl.$^4$ ........................................... C07C 143/56
[52] U.S. Cl. ..................................................... 562/59
[58] Field of Search .......................................... 562/59

[56] References Cited

U.S. PATENT DOCUMENTS

| 2,346,941 | 4/1944 | Reynolds | 562/59 |
| 3,776,749 | 12/1973 | McKay et al. | 106/288 Q |
| 3,936,496 | 2/1976 | Allan et al. | 260/510 |

*Primary Examiner*—Nicky Chan
*Attorney, Agent, or Firm*—Stephen V. O'Brien

[57] ABSTRACT

The invention provides compounds having the formula I or II

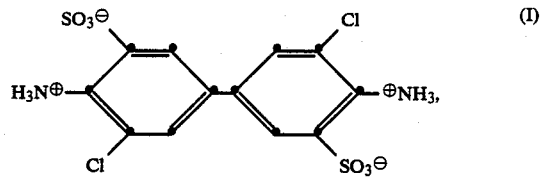

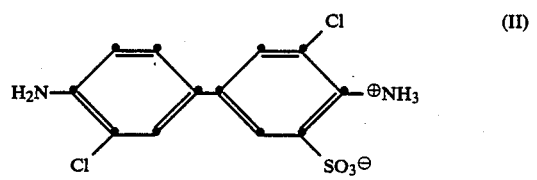

and their salts and hydrates, having high value as intermediates for dyestuff additives for pigment compositions and as intermediates for metal-containing pigments.

1 Claim, No Drawings

3,3'-DICHLORO-4,4-DIAMINODIPHENYL SULFONIC ACIDS

The present invention relates to new sulphonated 3,3'-dichlorobenzidine compounds, their production and their use.

In German Patent Specification No. 2 260 907 there are described asymmetric compounds having the formula 1 or 2:

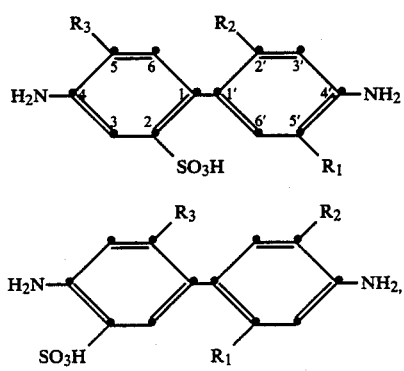

in which $R_1$, $R_2$ and $R_3$ are H, halogen, or 1-6C alkyl or alkoxy, or $R_2$ can be $SO_3H$. The compounds are produced by a benzidine rearrangement of the corresponding hydrazo compound. It will be noted that, in the compounds of formula 1 and 2, at most only two of the 3, 3', 5 and 5' position are occupied by substituents other than hydrogen.

We have now prepared certain new sulphonated derivatives of 3,3'-dichlorobenzidine having value e.g. as intermediates for dyestuff additives for pigment compositions and as intermediates for metal-containing pigments.

Accordingly, the present invention provides compounds having the formula I or II

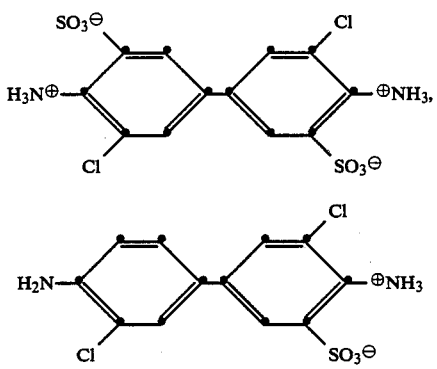

and their salts and hydrates.

The compounds are shown as Zwitterions as this is how they exist in the solid state. The present invention, however, is not limited to any particular ionic form of the new compounds.

The amount of water in the hydrates of above compounds can vary considerably, depending for example on drying temperature or hygroscopicity of these compounds. Accordingly, the hydrates may have one or more molecules of water associated with the compound of formula I or II, or their salts.

The compounds of the invention can also be isolated as salts formed between the sulphonic acid function and an inorganic or organic base. Examples of such salts include metal salts, ammonium salts or amine salts, especially salts of alkali metals, alkaline earth metals, metals of Groups IIB or VIIB according to the periodic Table of the Elements, ammonium salts, or salts of organic amines.

Specific examples of salts are those of lithium, sodium, potassium, calcium, zinc, manganese; those from amines such as ammonia, triethylamine, diethylaniline; and salts of tetraalkylammonium ions such as tetrabutylammonium.

The present invention also provides a process for the production of the compound of formula I or II comprising reacting 3,3'-dichlorobenzidine or its dihydrochloride salt with an appropriate stoichiometric amount of oleum at an elevated temperature.

The molar ratio of 3,3'-dichlorobenzidine to oleum used will vary, of course, depending upon whether it is desired to produce a disulphonic acid of formula I or a monosulphonic acid of formula II. For the production of a compound of formula I the 3,3'-dichlorobenzidine:oleum ratio is preferably substantially 1:2 and for compounds of formula II, the ratio is preferably substantially 1:1.

If desired, 3,3'-dichlorobenzidine dihydrochloride can be used as starting-material instead of 3,3'-dichlorobenzidine. In this case, the reaction mixture can be solubilised, if desired, by employing concentrated sulphuric acid as a solvent.

The concentration of the sulfur trioxide in the oleum used is conveniently within the range of from 20 to 30% by weight.

The reaction temperature may be varied over a wide range but a temperature range of from 90° C. to 180° C., preferably 100° C. to 160° C. is generally convenient.

After completion of the reaction, the reaction mixture may be worked up by conventional techniques.

An alternative method of producing a compound of formula I is by reacting a compound of formula II with oleum, conveniently using process conditions previously described herein.

The following Examples further illustrates the present invention.

Example 1:
3,3'-Dichloro-4,4'-diaminodiphenyl-5,5'-disulphonic acid from 3,3'-dichlorobenzidine 3,3'-Dichlorobenzidine free base (50.6 g, 0.2 mole) is added as a dried fine powder to stirred 25-30% oleum (122 g ca. 0.42 mole $SO_3$) at 20° C. The heterogeneous mixture is heated in an oilbath, and at 100° C., complete solution has occured. At 130°-140° C., the reaction mass sets to a dark grey solid. This is cooled to 80° C. and iced water added. The reaction product is broken up to a fine grey suspension and filtered. The product is somewhat water-soluble and therefore not washed. Yield 82 g (95% of theory).

Example 2:
3,3'-Dichloro-4,4'-diaminodiphenyl-5,5'-disulphonic acid from 3,3'-dichlorobenzidine dihydrochloride The dihydrochloride reactant is firstly dried at 70° C. for 16 hours. To 25-30% oleum (122 g, ca. 0.42 mole $SO_3$) is added dry 3,3'-dichlorobenzidine dihydrochloride (65.2 g, 0.2 mole) at 20° C. with stirring. External heat is applied until a temperature of 115°-120° C. is attained and this temperature held until all the solid goes into solution. Some evolution of hydrogen chloride occurs at this temperature and this becomes more obvious as the temperature is increased. At 148° C., the reaction mixture sets to a pale grey solid. The reaction mixture is cooled to below 80° C. and cold water added. The solid rapidly breaks down into a pale grey slurry which is filtered and not washed. Yield obtained is quantitative.

Example 3:
3,3'-Dichloro-4,4'-diaminodiphenyl-5,5'-disulphonic acid from 3,3'-dichlorobenzidine dihydrochloride in solution To 97.5% sulphuric acid (100 g) is added 25–30% oleum (160.4 g) followed by dry, powdered 3,3'-dichlorobenzidine dihydrochloride (65.2 g). The mixture is heated to 160° C. for 30 minutes and then cooled to 50° C., during which time no solid separates from the homogeneous solution. The acid is slowly stirred into ice-water (1 l.) and the resulting product is filtered. Yield after purification is 85% of theory.

The crude acidic product from Examples 1 to 3 can be purified, if needed, by fractional precipitation. The crude product is stirred in water and 20% aqueous sodium hydroxide added slowly. After passing through a thick phase at low pH, solution occurs at pH 4–6, provided the product concentration is not too high (ca. 4.5 liters of solution per mole of product at pH 4–6 at 60° C.). After charcoal addition and filtering through a filtering aid, the filtrate (dark coloured) is slowly treated with 5% aqueous hydrochloric acid. Product precipitating above pH 3 is discarded; product precipitating below pH 3 (down to pH 0.5) is collected by filtration and recycled through the alkali-acid treatment several times, isolating at lower pH on each occasion, finally at below pH 0.5. Purity is assessed by HPLC (high pressure liquid chromatography) on a reverse-phase column and can be obtained above 98% after just two alkali-acid cycles. Crude product is 91% pure, the main impurity (8%) being the mono-sulphonated product. Melting point of the resulting product: >300° C.

| Analysis (in %) | C | H | Cl | N | S | $H_2O$ |
|---|---|---|---|---|---|---|
| Calculated for $C_{12}H_{10}Cl_2N_2O_6S_2.H_2O$ (mol.w.: 431) | 33.4 | 2.8 | 16.5 | 6.5 | 14.9 | 4.2 |
| Found | 34.8 | 2.8 | 16.5 | 6.6 | 14.9 | 3.5 |

Infra-red absorptions (Nujol mull):
$\lambda$max (in cm$^{-1}$): 3100 (b), 2700 (b), 2590 (s), 1600 (b), 1575 (m), 1530 (s), 1495 (m), 1365 (m-s), 1300 (w), 1265 (s), 1240 (s), 1220 (s), 1200 (s), 1120 (s,b), 1075 (w), 1065 (m), 1035 (s), 880 (s), 855 (s), 815 (s), 800 (m-s), 710 (m-s), 645 (s).

b=broad; s=strong; m=medium; w=weak.

Titration of an alkaline solution with standard acid shows the presence of two monobasic acid groups.

The mono-sodium salt of the disulphonic acid can be obtained from a sodium hydroxide solution by acidification to pH 1–3. Concentrated hydrochloric acid (>20%) converts this to the free disulphonic acid.

Example 4:
3,3'-Dichloro-4,4'-diaminodiphenyl-5-sulphonic acid from 3,3'-dichlorobenzidine 3,3'-Dichlorobenzidine free base (25.3 g, 0.1 mole) is added as a dried fine powder to 25–30% oleum (30 g, ca. 0.1 mole $SO_3$). The mixture is stirred mechanically so that all amine is wetted by oleum. The thick solid is heated to 140° C. with occasional mixing and held for 30 minutes, then cooled to below 80° C., water is added and the solid product ground to give a grey paste. This is filtered and, without washing, the solid is re-slurried in water, and 20% aqueous sodium hydroxide solution added until a steady pH of 12 is maintained. Unreacted 3,3'-dichlorobenzidine is filtered off (ca. 40% recovery) and the filtrate carefully acidified to pH 1.5 with dilute hydrochloric acid. The crude monosulphonated product is isolated by filtration; washing with water; and drying. Yield 10.6 g (50% of theory).

Example 5:
3,3'-Dichloro-4,4'-diaminodiphenyl-5-sulphonic acid from 3,3'-dichlorobenzidine dihydrochloride The dihydrochloride reactant is firstly dried at 70° C. for 16 hours. To 25–30% oleum (60 g, ca. 0.206 mole $SO_3$) is added dry 3,3'-dichlorobenzidine dihydrochloride (65.2 g, 0.2 mole). The thick slurry is heated slowly but never attained solution. At 155°–160° C. the reaction mixture sets to a hard mass. This mass is cooled to below 80° C., water added and the thick slurry ground until a uniform paste is obtained. Sodium hydroxide is added as a 20% aqueous solution until a steady pH of 11 is obtained. Filtration gives recovered 3,3'-dichlorobenzidine (38%). The filtrate is acidified to pH 2.5, and the resulting product is filtered to give the mono-sulphonated product. This is washed with ice cold water and dried. Yield is 26.4 g (49% of theory).

Example 6:
3,3'-Dichloro-4,4'-diaminodiphenyl-5-sulphonic acid from 3,3'-dichlorobenzidine dihydrochloride in solution To 97.5% sulphuric acid (100 g) is added 25–30% oleum (100.4 g) followed by dry, powdered 3,3'-dichlorobenzidine dihydrochloride (65.2 g). The mixture is heated and becomes homogeneous at 100° C. Effervescence ceases at 160° C. and the mixture is held for 15 minutes at 160° C., then cooled; product precipitates at below 60° C. The mixture is added to ice-water and filtered.

Yield after purification of the resulting product: ca. 50% (based on reacted 3,3'-dichlorobenzidine).

The crude acidic product from Example 4, 5 or 6 can be purified, if needed, as follows: the product is slurried in water and sodium hydroxide added to pH 12. Unreacted 3,3'-dichlorobenzidine is removed by filtration and the filtrate acidified with hydrochloric acid to pH 2.0. The monosulphonic acid is filtered off and put through the alkaline-acid precipitation process several times. At pH values below 2.0, increasing amounts of di-sulphonated product are obtained.

Purity is assessed by HPLC on a reverse-phase column and can be obtained at 94% after 3–4 alkali-acid cycles.

| Analysis: (in %) | C | H | Cl | N | S | $H_2O$ |
|---|---|---|---|---|---|---|
| Calculated for $C_{12}H_{10}Cl_2N_2O_3S.H_2O$ | 41.04 | 3.44 | 20.19 | 7.98 | 9.13 | 5.13 |
| Found | 40.6 | 3.34 | 19.1 | 7.61 | 9.1 | 5.3 |

Infra-red absorptions (Nujol mull):
$\lambda$max (in cm$^{-1}$): 3470 (s), 3370 (s), 2620 (b), 1620 (s), 1605 (s), 1300 (m), 1280 (w), 1215 (s), 1175 (s), 1100

(m-s), 1070 (w), 1030 (s), 895 (w), 870 (m), 830 (w), 820 (m), 800 (w), 735 (m), 695 (m), 640 (s).

Titration of an alkaline solution with standard acid shows the presence of one monobasic acid group.

Example 7:

This example illustrates the tetrazotisation of 3,3'-dichloro-4,4'-diaminodiphenyl-5,5'-disulphonic acid and its coupling to acetoacet-m-xylidide. 3,3'-Dichloro-4,4'-diaminodiphenyl-5,5'-disulphonic acid (41.3 g, 0.1 mole) is slurried in water (250 ml) and 20% aqueous sodium hydroxide solution added to pH 11.0. Sodium nitrite (13.8 g, 0.2 mole) in water (50 ml) is added and the combined mixture poured over 5 minutes into a mixture of concentrated hydrochloric acid (50 g) and ice-water (1 liter). The initial deep red colored mixture is rapidly replaced by a brick-red slurry of the tetrazonium salt. Excess nitrous acid is removed with sulphamic acid solution just prior to coupling.

Acetoacet-m-xylidide (41.0 g, 0.2 mole) is dissolved in a solution of sodium hydroxide (9 g) in water (500 ml) and reprecipitated by addition to 80% acetic acid (16 g) in water (1 l.). The pH is adjusted to 5.0 and temperature to 10° C.

The tetrazonium salt slurry is added over 45 minutes keeping pH at 5.0 by simultaneous addition of aqueous 5% sodium hydroxide solution. Temperature is kept between 10°-20° C. by ice addition when necessary. Excess tetrazonium salt is monitored by checking with H-Acid solution. On completion the pH is adjusted to 8.0 and the dyestuff slurry (containing 1.7% dyestuff) used for Examples 8 and 9.

Example 8:

This Example illustrates the use of the dyestuff slurry formed in Example 7 as an additive in Pigment Yellow C.I. Nr. 13.

1 Liter of slurry of Pigment Yellow 13 (prepared by coupling tetrazotised 3,3'-dichlorobenzidine with acetoacet-m-xylidide in aqueous solution at pH 4.5) containing 8% pigment solids is treated with the slurry (118 g) prepared in Example 7 so as to give 2.5% dyestuff on pigment. The mixture is resinated and aftertreated in the normal manner (see, for example, Example 4 in GB No. 1356253) to give a pigment powder.

On incorporation of this pigment into an oil ink varnish, the ink exhibits enhanced colour strength and increased transparency over that produced from a pigment not incorporating the dyestuff.

Example 9:

This Example illustrates the conversion of the dyestuff slurry formed in Example 7 to a metal salt pigment.

1 Liter of the slurry from Example 7 [containing approximately 17 g (0.02 mole) dyestuff] is treated with calcium chloride dihydrate (6 g, 0.04 mole) in water (100 ml). The mixture is heated to 95° C. for 30 minutes, filtered, washed, dried and ground.

The yellow pigment can be incorporated into ink, paint and plastics where it exhibits non-bleeding properties.

Example 10:

This Example illustrates the tetrazotisation of 3,3'-dichloro-4,4'-diaminodiphenyl-5-sulphonic acid and its coupling to acetoacet-m-xylidide. 3,3'-Dichloro-4,4'-diaminodiphenyl-5-sulphonic acid (33.3 g, 0.1 mole) is slurried in water (250 ml) and 20% aqueous sodium hydroxide solution added to pH 11.0. Sodium nitrite (13.8 g, 0.2 mole) in water (50 ml) is added and the mixture added, rapidly at first, then slowly, to a mixture of concentrated hydrochloric acid (50 g) and ice-water 91 liter). The tetrazoium salt is used directly in the coupling stage, sulphamic acid solution being added just prior to coupling.

Acetoacet-m-xylidide (41.0 g, 0.2 mole) is dissolved in a solution of sodium hydroxide (9 g) in water (500 ml) and precipitated by addition to 80% acetic acid (16 g) in water (1 liter). The pH is adjusted to 5.0 and temperature to 10° C.

The tetrazonium salt is added over 45 minutes keeping the pH at 5.0 by simultaneous addition of aqueous 5% sodium hydroxide solution. The temperature is kept between 10°-20° C. by ice addition when necessary. Excess of tetrazonium salt is minimised by constant checking with H-Acid. On completion the pH is adjusted to 7.0. The slurry (containing 1.5% dyestuff) is used in Examples 11 and 12.

Example 11:

This Example illustrates the use of the dyestuff slurry formed in Example 10 as an additive in Pigment Yellow 13.

The same procedure is adopted as in Example 8 except that 133 g of the slurry prepared in Example 10 is used instead of the slurry from Example 7.

The ink (see Example 8) prepared using this dyestuff-treated pigment exhibits enhanced colour strength and increased transparency over that produced from a pigment not incorporating the dyestuff.

Example 12:

This Example illustrates the use of the dyestuff slurry formed in Example 10 into a metal salt pigment.

1 Liter of the slurry from Example 10 [containing approximately 15.3 g (0.02 mole) dyestuff] is treated with calcium chloride dihydrate (3 g, 0.02 mole) in water (50 ml). The mixture is heated to 95° C. for 30 minutes, filtered, washed, dried and ground.

The yellow pigment can be incorporated into ink, paint and plastics where it shows non-bleeding properties.

I claim:

1. A compound having the formula I or II

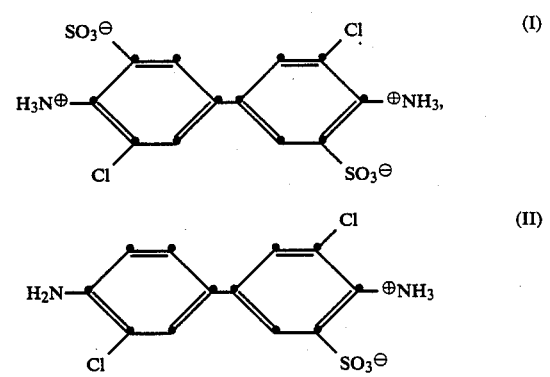

or its salt or hydrate thereof.

* * * * *